United States Patent [19]

Reilly et al.

[11] Patent Number: 5,083,210

[45] Date of Patent: Jan. 21, 1992

[54] ELIMINATION OF CONTOURING ON DISPLAYED GRAY LEVEL IMAGES

[75] Inventors: Paul E. Reilly, Rochester; Daniel Fleysher, Pittsford; Paul A. Rulli, Webster; Jack T. Latone, Rochester, all of N.Y.

[73] Assignee: Xerox Corporation, Stamford, Conn.

[21] Appl. No.: 590,095

[22] Filed: Sep. 28, 1990

[51] Int. Cl.$^5$ .......................... H04N 1/21; H04N 1/40
[52] U.S. Cl. ..................... 358/298; 358/455; 358/456; 358/457
[58] Field of Search ............... 358/298, 455, 456, 457, 358/465, 466

[56] References Cited

U.S. PATENT DOCUMENTS

| 4,280,144 | 7/1981 | Bacon | 358/280 |
|---|---|---|---|
| 4,366,507 | 12/1982 | Mori | 358/283 |
| 4,449,150 | 5/1984 | Kato | 358/283 |
| 4,486,785 | 12/1984 | Lasher et al. | 358/284 |
| 4,578,713 | 3/1986 | Tsao et al. | 358/456 |
| 4,578,714 | 3/1986 | Sugiura et al. | 358/457 |
| 4,593,325 | 6/1986 | Kannapell et al. | 358/282 |
| 4,667,247 | 5/1987 | Karow | 358/455 X |
| 4,692,811 | 9/1987 | Tsuchiya et al. | 358/465 |
| 4,700,235 | 10/1987 | Gall | 358/283 |
| 4,783,838 | 11/1988 | Matsunawa | 358/457 X |
| 4,841,377 | 6/1989 | Hiratsuka | 358/456 |
| 4,916,545 | 4/1990 | Granger | 358/456 |

FOREIGN PATENT DOCUMENTS 56-141667 11/1981 Japan .
56-143766 11/1981 Japan .

Primary Examiner—Benjamin R. Fuller
Assistant Examiner—Eric Frahm

[57] ABSTRACT

An electronic reprographic system with a scanner for scanning the document pages of a job and converting the document images scanned to an array of binary pixels. The ability to convert a high resolution array of binary pixels representing the scanned image to a lower resolution, gray version for display on a screen and further eliminate effects of contouring and moire on the displayed image.

6 Claims, 8 Drawing Sheets

FIG. 5

ELIMINATION OF CONTOURING ON DISPLAYED GRAY LEVEL IMAGES

The invention relates to electronic image processing systems, and more particularly, to a process for eliminating visual contouring on displayed gray level images.

Further electronic reprographic systems are intended to provide the operator or user with as many job programming options and selections as reasonably possible. To facilitate easy programming of these options, it is advantageous to display a representation of the scanned image on the user interface so that the operator can designate areas on the document to apply a particular option. One can envision the scenario where a document contains text along with a photograph. By looking at the scanned image on the user interface, the operator can determine exactly where on the document the photograph is and program the system to treat the photograph differently from the text, (i.e., apply a screen to the photograph and threshold the text).

Often, the pixel resolution of the user interface display is much less than that of the scanned image therefore, making it impractical to display the actual scanned image. To remedy this situation, the scanned image is processed to enable viewing on the user interface. Processing includes changing the resolution of the scanned image to fit within the resolution of the user interface. When doing a resolution conversion, the resulting image may have defects, such as moire patterns and contouring effects caused by sharp transitions in gray levels. Therefore, it is advantageous to eliminate these defects before displaying the image on the user interface.

In the prior art, U.S. Pat. No. 4,366,507 to Mori discloses a shaded picture signal processing system wherein false contours appearing as quantization distortion is eliminated by dispersing noise, equal in magnitude to the false contours, throughout the whole picture thus, causing the false contours not to be seen. U.S. Pat. No. 4,593,325 to Kannapell et al. discloses an adaptive threshold method for processing gray scale image data. A threshold is calculated by adding 0.4 of the contrast, previously calculated, to the background. U.S. Pat. No. 4,486,785 to Lasher et al. discloses a method for reducing the visual impact of stepped edges by selective introduction of grayscale scanned picture elements (PELs). Non-coded binary image PEL data is received, stored and examined on a PEL by PEL basis to identify unit steps in binary PEL values. The stored data is modified by assigning gray scale values to a limited number of PELs to create a string of gradually changing gray scale values to reduce contouring. U.S. Pat. No. 4,280,144 to Bacon discloses an apparatus and method for improving the print quality of a coarse scan by increasing the resolution of the printed image using the values of the scanned image to calculate new values for the printed image. U.S. Pat. No. 4,916,545 to Granger discloses a method of suppressing noise patterns by randomly varying the dot fonts used to create the halftone dot on the resulting image.

U.S. Pat. No. 4,449,150 to Kato discloses a method of using random threshold matrices to screen an image. The method uses random numbers to chose which matrix to use. U.S. Pat. No. 4,700,235 to Gall discloses a method for printing of color halftone forms by using randomly selected screen threshold values. Each screen color separation has an arbitrary screen angle through which it is rotated to further reduce moire patterns. U.S. Pat. No. 4,578,714 to Sugiura et al. discloses a halftone image recording apparatus that utilizes a randomly generated signal level for adding to the image signal. Japanese Patent Laid Open Application No. JP-A 56-143,766 (Canon) discloses a dither method of thresholding wherein a random number is used as the dither value. Japanese Laid Open Application No. JP-A 56,141,667 (Canon) discloses a random dither method wherein white noise is filtered out of the original image signal. Thresholding is accomplished by comparing the non-filtered image data to the filtered image data.

In contrast, the present invention provides a method for eliminating contours on a displayed image for an electronic reprographic system, the displayed image consisting of an array of image signals composed of black and white binary pixels, the system having a memory for storing the array, and a screen capable of displaying gray image signals, the gray image signals having G bits per gray level, comprising the steps of: (a) selecting a first area of the array consisting of $N \times N$ binary pixels; b) summing the black pixels in the area resulting in a sum of black pixels; c) adding pseudo-random noise to the sum of black pixels whereby to provide an adjusted sum of black pixels; d) linearly mapping the adjusted sum to provide a gray image signal; e) moving a second area a distance D from the first area of the array; f) repeating steps b through d until the second area is linearly mapped to the gray image signal; g) repeating steps e and f for subsequent $N \times N$ areas of the array until the array is converted to the gray image signals for displaying on the screen; and h) displaying the gray image signal on the screen.

IN THE DRAWINGS

FIG. 5 is a magnified view of a binary image array with a $N \times N$ area selected;

Figure 1:
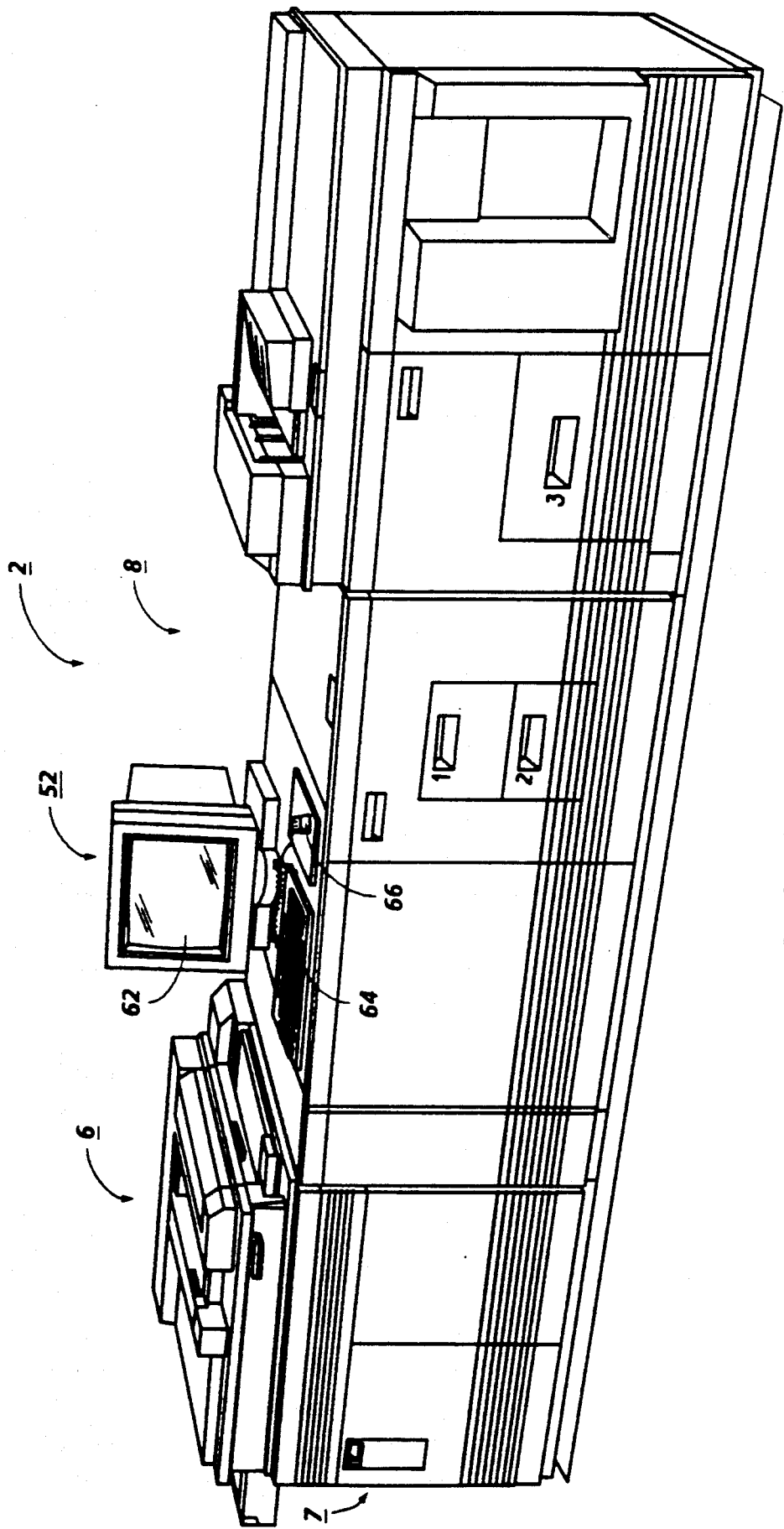
FIG. 1 is a view depicting an electronic reprographic system incorporating the present invention.
Figure 2:
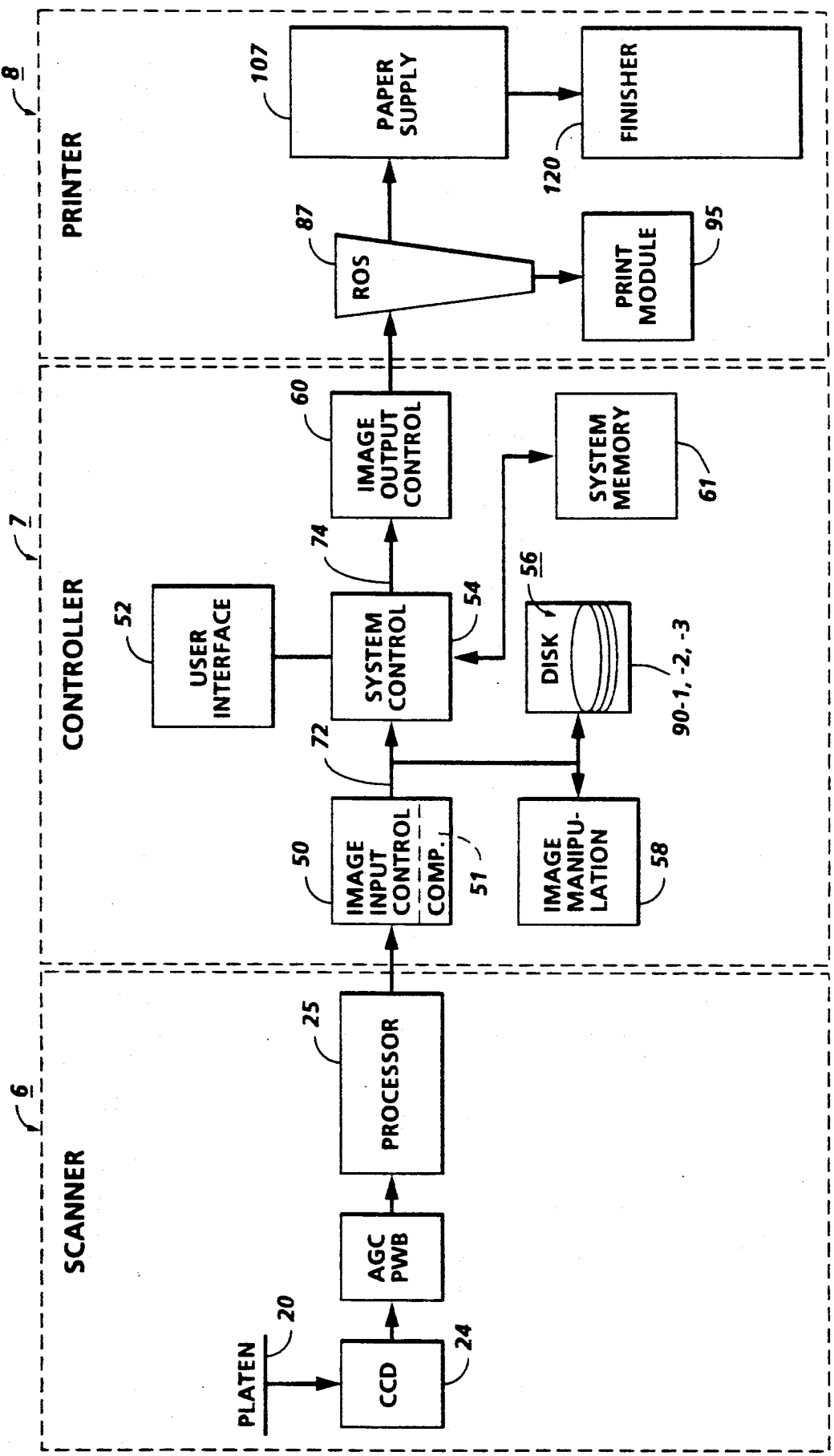
FIG. 2 is a block diagram depicting the major elements of the system shown in FIG. 1.

Referring to FIGS. 1 and 2, there is shown an exemplary laser based electronic reprographic system 2 for processing print jobs in accordance with the teaching of the present invention. System 2 for purposes of explanation is divided into a scanner section 6, controller section 7, and printed section 8. While a specific printing system is shown and described, the present invention may be used with other types of printing systems such as ink jet, ionographic, etc.

Figure 3:
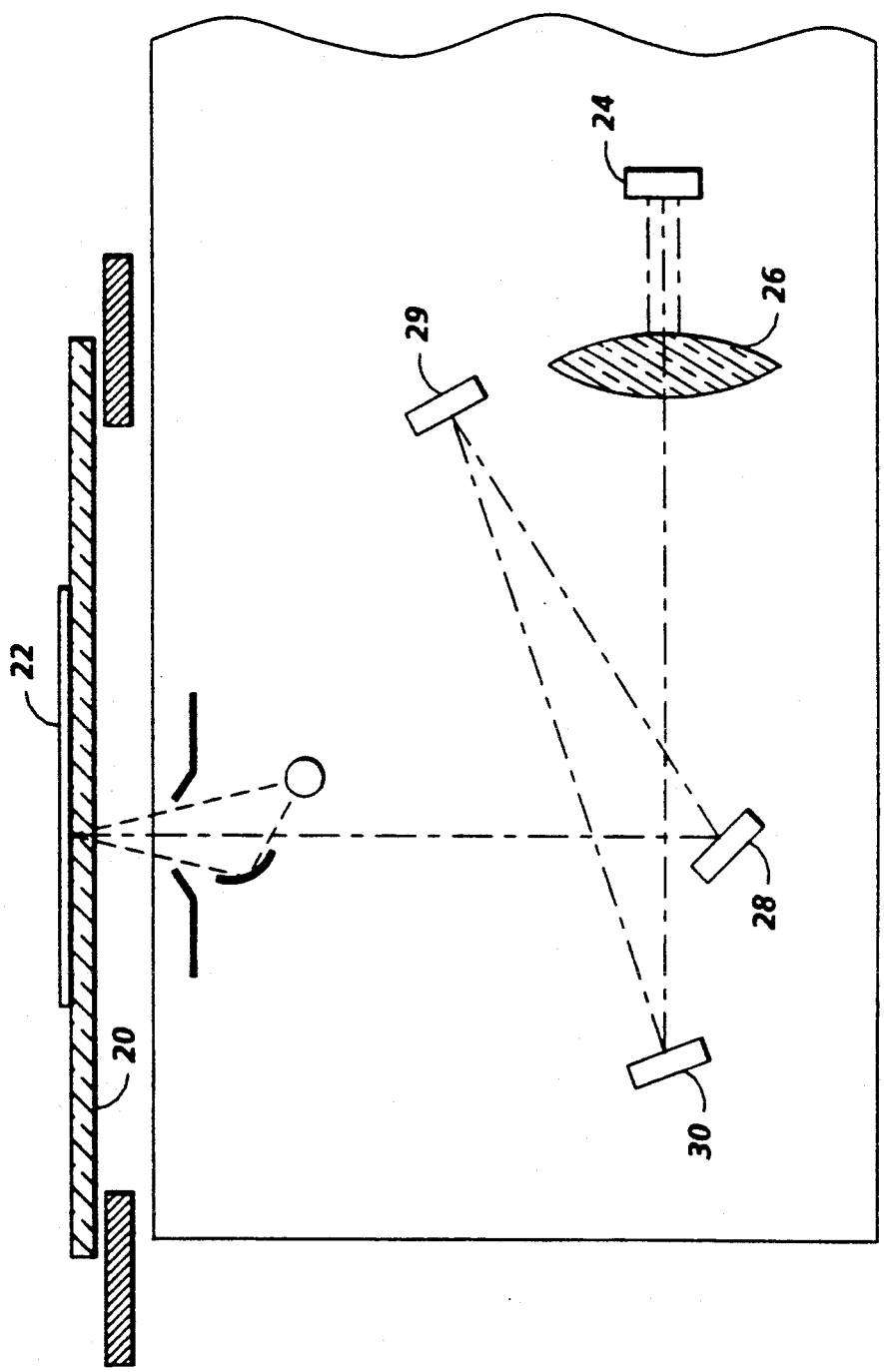
FIG. 3 is schematic view showing certain construction details of the document scanner of the system shown in FIG. 1.

Referring particularly to FIGS. 2 and 3, scanner 6 incorporates a transparent platen 20 on which the document 22 to be scanned is located. One or more linear arrays 24 are supported for reciprocating scanning movement below platen 20. Lens 26 and mirrors 28-30 cooperate to focus array 24 on a line like segment of platen 20 and the document being scanned thereon. Array 24 provides image signals or pixels representative of the image scanned which after suitable processing by process 25, are output to controller 7.

Processor 25 converts the analog image signals output by array 24 to digital and processes the image data from scanner 6 as required to enable system 2 to store and handle the image data in the form required to carry out the job programmed. For image data input by scanner 6, processor 25 also provides enhancements and changes to the image signals such as filtering, thresholding, screening, cropping, reduction/enlarging, etc. Following any changes and adjustments in the job program, the document must be rescanned.

Referring to FIGS. 1-3, controller 7 is, for explanation purposes, divided into an image input controller 50, User Interface (UI) 52, system controller 54, main memory 56, image manipulation section 58, and image output controller 60.

The scanned image data input to controller 7 is compressed by image compressor/processor 51 of image input controller 50. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT/screen display consisting of an interactive touchscreen 62, keyboard 64, and mouse 66. UI 52 interfaces the operator with system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point a cursor to the items selected and keying mouse 66.

Main memory 56 has plural hard disks 90-1, 90-, 90-3 for storing machine Operating System software, machine operating data, and the scanned image data currently being processed.

When the compressed image data in main memory 56 requires further processing, or is required for display on touchscreen 62 of UI 52, or is required by printer 8, the data is accessed in main memory 56. Where further processing other than the provided by processor 25 is required, the data is transferred to image manipulation section 58 where the additional processing steps such as collation, make ready, decomposition, etc. are carried out. Following processing, the data may be returned to main memory 56, sent to UI 52 for display on touchscreen 62, or sent to image output controller 60.

Figure 4:
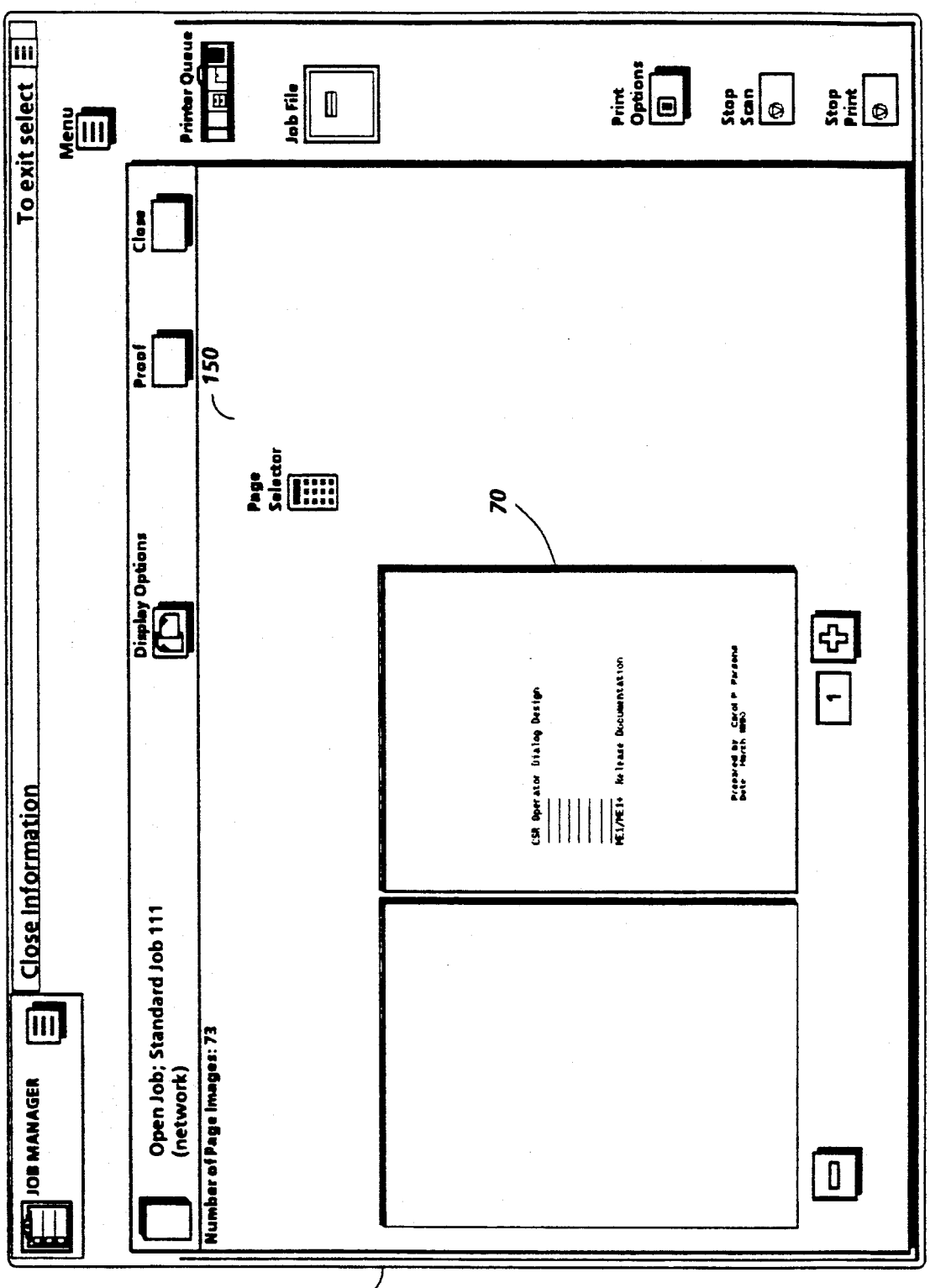
FIG. 4 is a view depicting an exemplary displayed document displayed on the User Interface touchscreen of the system shown in FIG. 1.

In FIG. 4 there is shown an example of an image 70 described above. The image data can optionally be displayed on touchscreen 62, image 70 being derived from the image data stored in main memory 56. In accordance with the described invention, the image data is further processed to enhance the display on touchscreen 62.

Referring also to FIGS. 5-8, after processing by processor 25, the data for image 70 is represented as a binary array 72 of high resolution black and white binary pixels 73. Binary array 72 is an exemplary magnified view of the image data after processing by processor 25.

Since the pixel resolution of binary array 72 must be reduced to display image 70 on touchscreen 62, not all pixels 73 in binary array 72 will be displayed. Further, since touchscreen 62 displays gray level pixels, and not binary pixels, the pixels 73 in binary array 72 must be converted to gray level pixels having G bits per pixel before displaying. Defects in displayed image 70 such as contouring and moire can be visible as a result of the changes in resolution and from the grayscale conversion. The present invention, as will appear, eliminates, or at least reduces the defects as a result of conversion to a lower resolution and conversion to grayscale.

Figure 5:
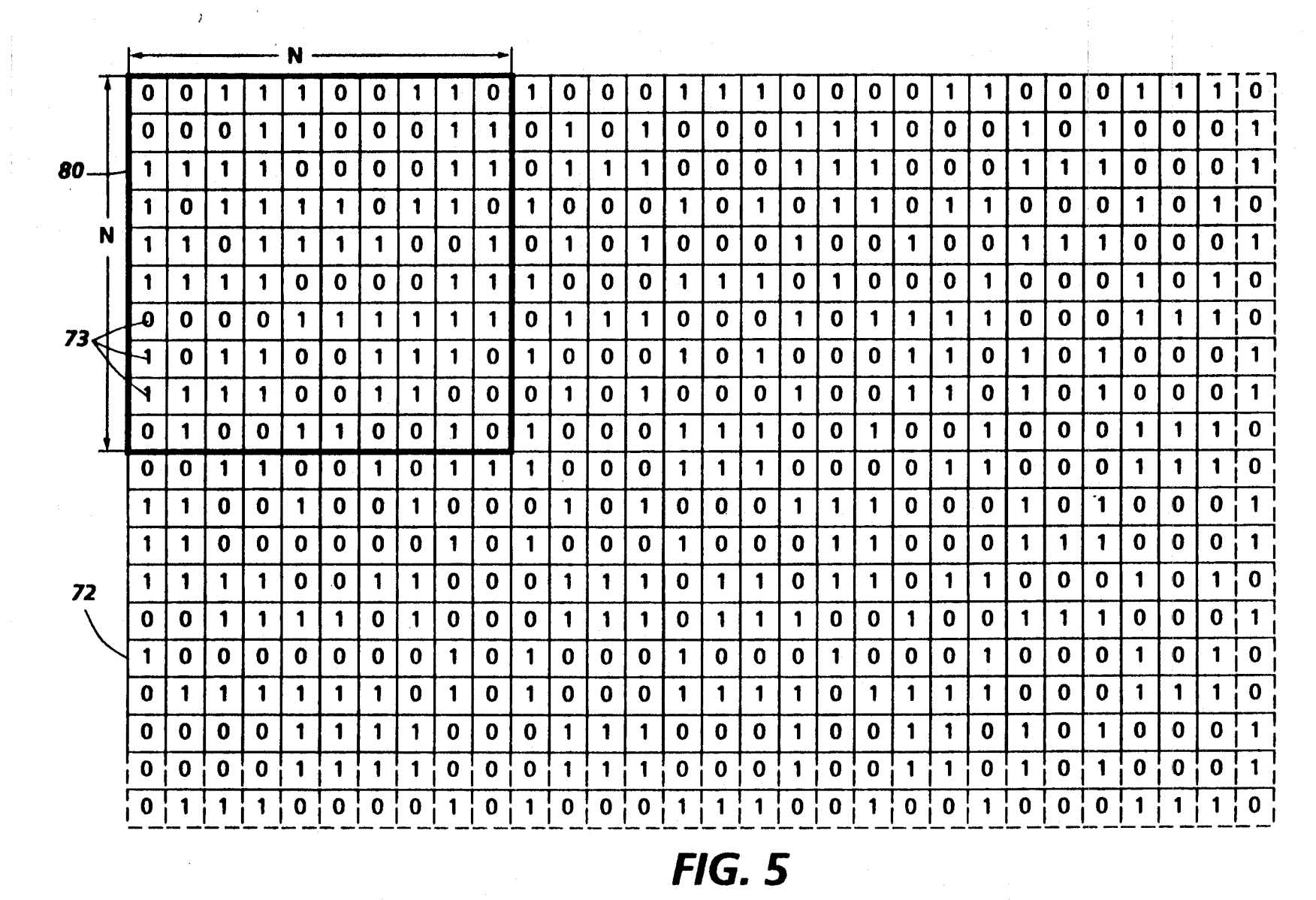
Figure 8:
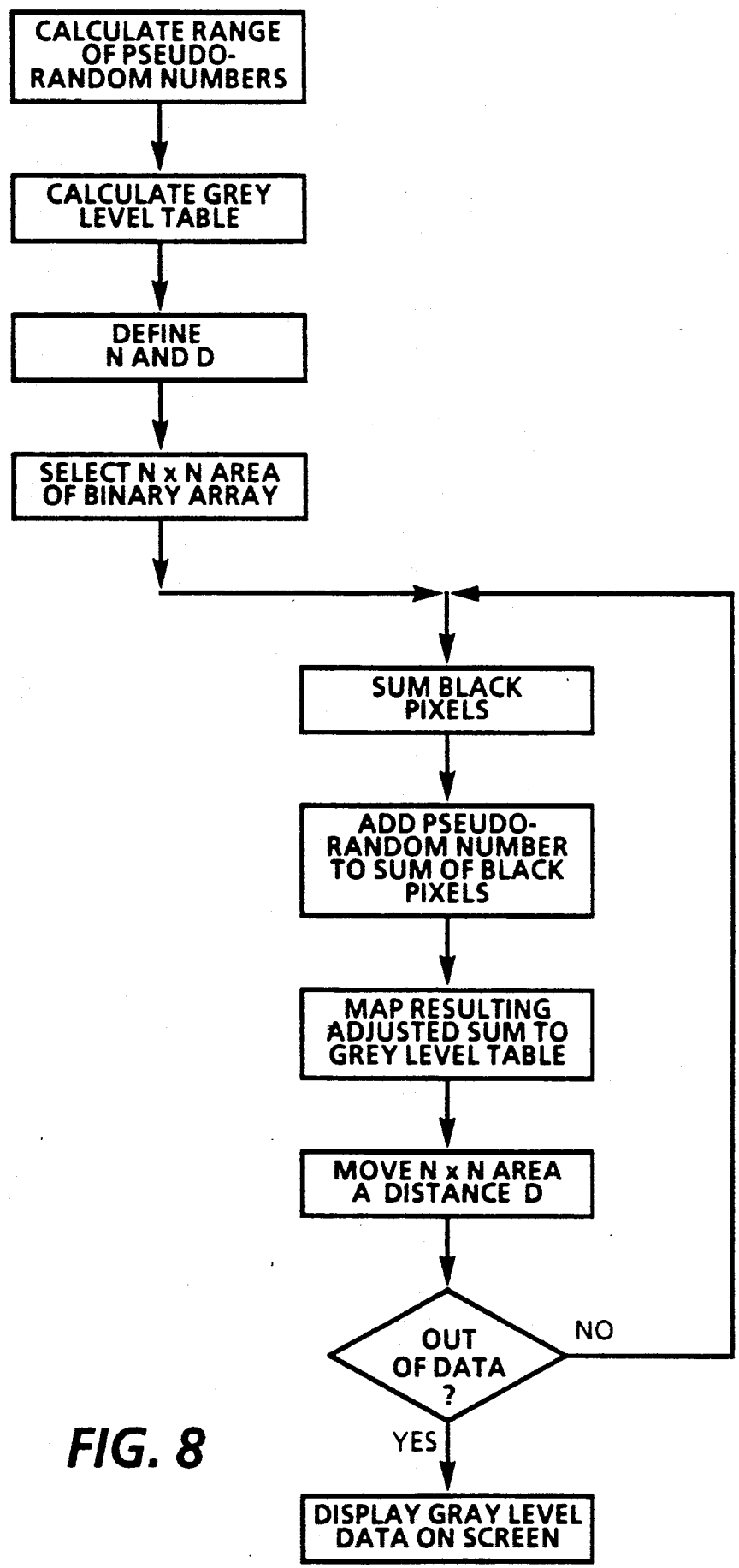
FIG. 8 is a flow chart in accordance with the present invention.

Referring especially to FIGS. 2, 5 and 8, to convert binary array 72 for display, pixels 73 to binary array 72 are grouped into a series of square segments 80 each containing $N \times N$ binary pixels by image manipulation processor 58. Black pixels 73, (in this case pixels having a value of one,) in each segment 80 are summed together.

A pseudo-random number, taken from an allowed range of pseudo-random numbers, is added to the sum of black pixels resulting in an Adjusted Sum of black pixels. Referring to the Appendix procedure CreateDither Pattern, (Copyright (1990), Xerox Corporation. All rights reserved.), an allowed range of pseudo-random numbers are calculated in software and downloaded to be used by image manipulation processor 58. The range (R) of allowable pseudo-random numbers is defined by the equation $R = \pm N^2/2^{(G+1)}$ where $N^2$ is the number of pixels 73 in segment 80 and G is the number of gray bits per pixel following conversion to a gray display pixel. The above range assumes that no resulting gray display pixel will be altered by more than a value of plus or minus one as a result of adding the pseudo-random number to the sum of black pixels (referred to hereinafter as "Adjusted Sum").

Referring also to the Appendix procedure CreateThresholdTable, (Copyright (1990), Xerox Corporation. All rights reserved.) a gray scale table is calculated and downloaded to image manipulation processor 58. The adjusted Sum is then linearly mapped to the gray scale table containing $2^G$ values creating a representative gray display pixel for the binary pixels inside box $N \times N$. The gray value resulting from mapping will have a value ranging from 0 to $2^G - 1$. Adding the pseudo-random number to the sum of black pixels before mapping has shown to reduce the contouring effect on displayed image 70. Once conversion of binary array 72 is complete, the resulting displayed image 70 can be displayed on touchscreen 62.

Display resolution conversion described above can result in poor image quality, caused specifically by a moire pattern, especially when binary image data may be the result of halftoning during the scanning process. To remove moire effects from displayed image 70, N must be chosen to be a multiple of the number of binary pixels corresponding to the period of the input image halftone frequency. Choosing a value of N which is the closest of distance D, described below, is most effective at reducing moire. For example, if the period of the halftone frequency is 5, N=10 or N=15 are suitable choices But, if D=7, N=10 is the best choice because it is closest to D=7. With the value of N thus restricted, the value of D, described below, must be allowed to vary somewhat from N in order to achieve the desired display image size.

Figure 6:
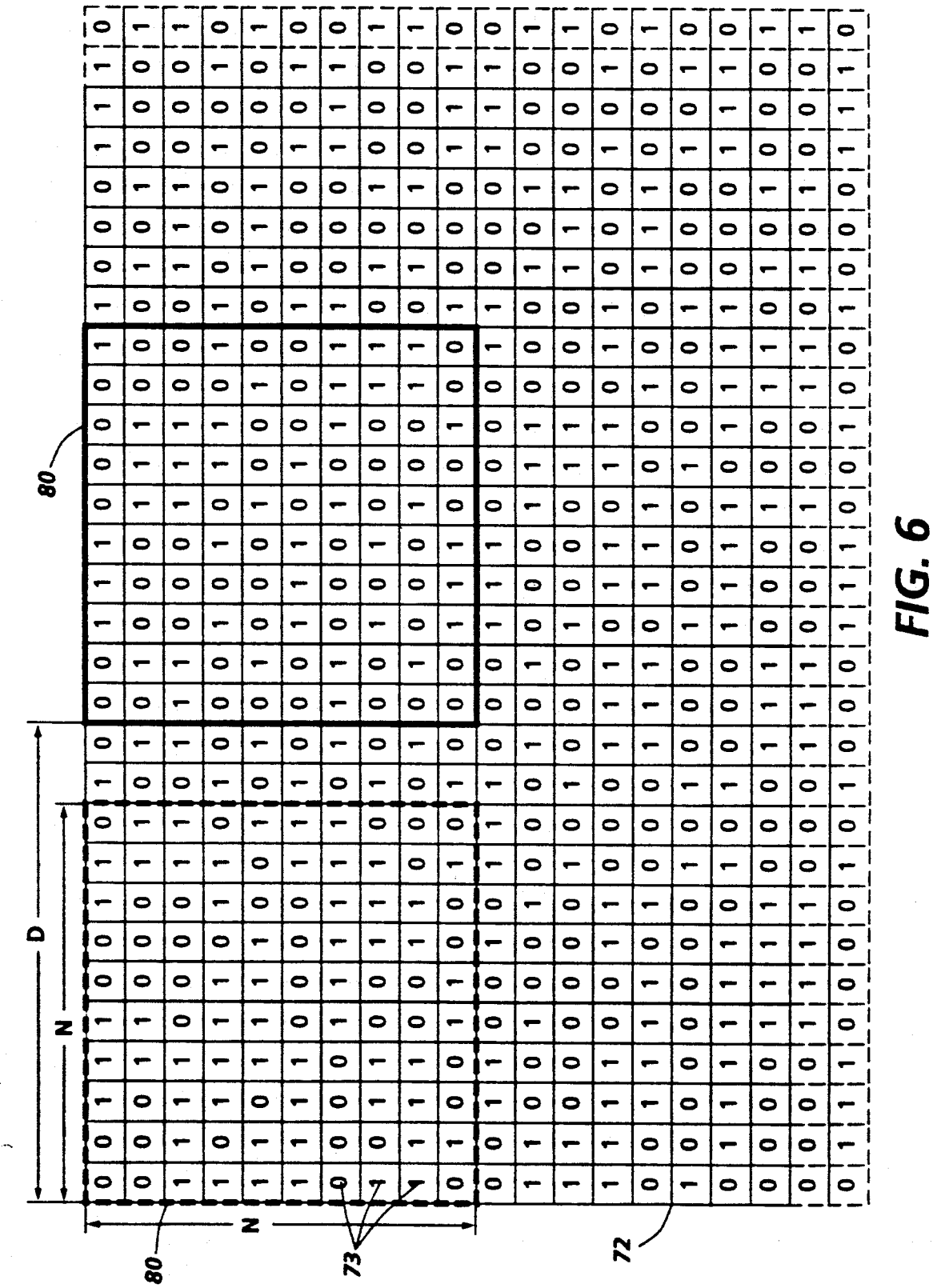
FIG. 6 is a magnified view of a binary image array with a $N \times N$ area selected depicting a movement of the $N \times N$ area a distance $D > N$.
Figure 7:
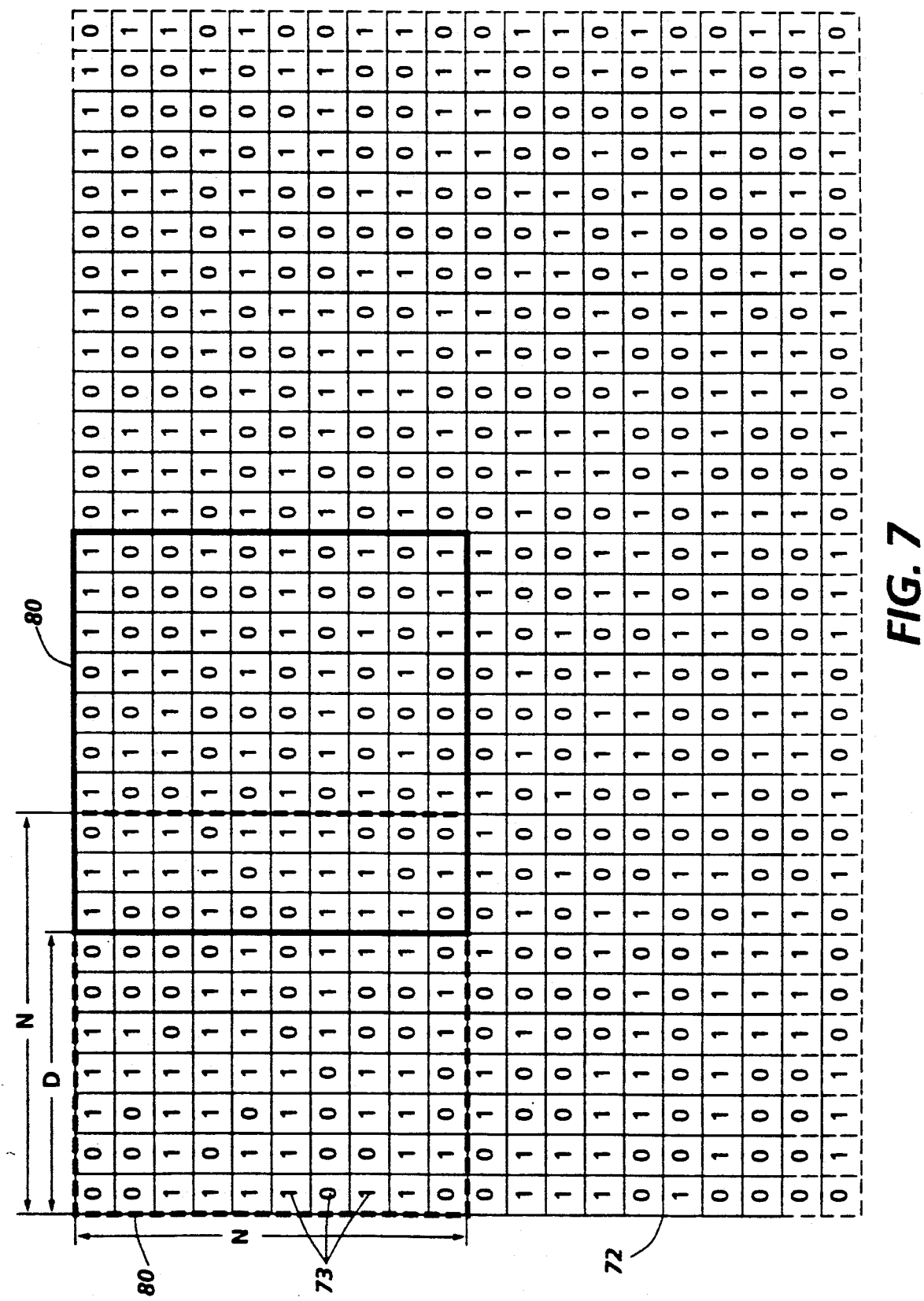
FIG. 7 is a magnified view of a binary image array with a $N \times N$ area selected depicting a movement of the $N \times N$ area a distance $D < N$.

The number of segments 80 depends on the number of binary pixels in array 72 and the number of gray pixels are to be displayed on touchscreen 62. As each gray display pixel value is obtained, segment 80 is in effect, moved to the next location to calculate the next gray display pixel. As shown in FIGS. 6 and 7, N×N segment 80 is moved a distance D. The value of D determines the number of gray pixels that result from the conversion and therefore, the size of displayed image 70. When D<N, oversampling occurs wherein some binary pixels are sampled more than once, thus contributing to more than one gray display pixel in displayed image 70. When D>N, undersampling occurs wherein some binary pixels between adjacent sample N×N segments 80 are not used in calculating the value of a gray display pixel in displayed image 70. When D=N, (not shown) all pixels 73 in array 72 are used in calculating the value of gray display pixels in displayed image 70. It will be understood that where segment 80 overlaps either the top, bottom or side margins of array 72, pixels 73 in the margins are assumed to be white and therefore a pixel value of "0" is arbitrarily assigned.

In the example, as shown in FIG. 7, assume N=10 and D=7, a touchscreen 62 is assigned to contain 4 bits per pixel, (i. e., G=4). Accordingly, the resulting gray pixel will have a gray value between 0 and 31. When N×N segment 80 is in the initial position, the sum of black pixels in this example is 54. The range of pseudo-random numbers that can be added to 54 is plus or minus 100/32 which equals approximately 3. The adjusted value, 54 plus the pseudo-random number between plus and minus 3 resulting in the Adjusted Sum, is then linearly mapped to a gray value between 0 and 31. Segment 80 is then moved to the right by D=7 pixels. The conversion process is repeated for each movement of segment 80 by D to the next area of array 72 until a gray pixel value is calculated for each pixel to be displayed on touchscreen 62.

It is understood that in the above example, the determination of N, the determination of D, the calculations as to range of pseudo-random numbers, the sum of black pixels, and the range of gray pixel values are exemplary and that the invention is not intended to be so limited. Calculations based on other data and/or assumptions may provide different results.

While the invention has been described with reference to the structure disclosed, it is not confined to the details set forth, but is intended to cover such modification or changes as may come within the scope of the following claims.

APPENDIX

Copyright (C) 1990 by Xerox Corporation. All rights reserved.

```
--Types
Dither8by8Pattern: TYPE = ARRAY [0..8) OF ARRAY [0..8) OF INTEGER;

-- Vars bayerPattern: Dither8by8Pattern = [
  [0, 16, 4, 20, 1, 17, 5, 21], [24, 8, 28, 12, 25, 9, 29, 13], [
  6, 22, 2, 18, 7, 23, 3, 19], [30, 14, 26, 10, 31, 15, 27, 11], [
  1, 17, 5, 21, 0, 16, 4, 20], [25, 9, 29, 13, 24, 8, 28, 12], [
  7, 23, 3, 19, 6, 22, 2, 18], [31, 15, 27, 11, 30, 14, 26, 10]];

--Procedures

CreateDitherTable: PROCEDURE [windowSize: CARDINAL]
  RETURNS [
    dTable: LONG POINTER TO IMSTypes.DitherTable ← NIL,
    size, maxDither: CARDINAL ← 0] =
  BEGIN
    maxPatternValue: CARDINAL ← 31;
    IF windowSize < 6 THEN {dTable ← NIL; size ← 0; maxDither ← 0; }
    ELSE {
      dTable ← z.NEW[IMSTypes.DitherTable];
      size ← 16;
      SELECT windowSize FROM
        IN [6..8] => { -- gap 0-4
          FOR j: CARDINAL IN [0..15] DO
```

```
      FOR i: CARDINAL IN [0..15] DO
        dTable[i][j] ← (bayerPattern[i MOD 8][j MOD 8] / 8); ENDLOOP;
      ENDLOOP;
      maxDither ← maxPatternValue / 8};
    IN [9..11] = > { -- gap 5-8
      FOR j: CARDINAL IN [0..15] DO
        FOR i: CARDINAL IN [0..15] DO
          dTable[i][j] ← (bayerPattern[i MOD 8][j MOD 8] / 4); ENDLOOP;
      ENDLOOP;
      maxDither ← maxPatternValue / 4};
    IN [12..16] = > { -- gap 9-16
      FOR j: CARDINAL IN [0..15] DO
        FOR i: CARDINAL IN [0..15] DO
          dTable[i][j] ← (bayerPattern[i MOD 8][j MOD 8] / 2); ENDLOOP;
      ENDLOOP;
      maxDither ← maxPatternValue / 2};
    IN [17..22] = > { -- gap 17-32
      FOR j: CARDINAL IN [0..15] DO
        FOR i: CARDINAL IN [0..15] DO
          dTable[i][j] ← (bayerPattern[i MOD 8][j MOD 8]); ENDLOOP;
      ENDLOOP;
      maxDither ← maxPatternValue};
    IN [23..32] = > { -- gap 33-64
      FOR j: CARDINAL IN [0..15] DO
        FOR i: CARDINAL IN [0..15] DO
          dTable[i][j] ← ((bayerPattern[i MOD 8][j MOD 8] * 2) + 1);
        ENDLOOP;
      ENDLOOP;
      maxDither ← maxPatternValue * 2 + 1};
    IN [33..39] = > { -- gap 65-96
      FOR j: CARDINAL IN [0..15] DO
        FOR i: CARDINAL IN [0..15] DO
          dTable[i][j] ← ((bayerPattern[i MOD 8][j MOD 8] * 3) + 2);
        ENDLOOP;
      ENDLOOP;
      maxDither ← maxPatternValue * 3 + 2};
    IN [40..45] = > { --gap 97-128
      FOR j: CARDINAL IN [0..15] DO
        FOR i: CARDINAL IN [0..15] DO
          dTable[i][j] ← ((bayerPattern[i MOD 8][j MOD 8] * 4) + 4);
        ENDLOOP;
      ENDLOOP;
      maxDither ← maxPatternValue * 4 + 4};
    IN [46..64] = > { --gap 129-256
      FOR j: CARDINAL IN [0..15] DO
        FOR i: CARDINAL IN [0..15] DO
          dTable[i][j] ← ((bayerPattern[i MOD 8][j MOD 8] * 8) + 8);
        ENDLOOP;
      ENDLOOP;
      maxDither ← maxPatternValue * 8 + 8};
    ENDCASE;
  };
END; --CreateDitherTable
```

```
CreateThresholdTable: PROC [
  apertureSize, maxDither, maxGray: CARDINAL ← 0, dither: BOOLEAN ← FALSE,
  algorithm: GrayImage.ConversionMethod ← linear]
  RETURNS [tTable: LONG POINTER TO IMSTypes.ThresholdTable ← NIL] =
BEGIN
  threshold: CARDINAL ← 0;

Function: PROC [x, maxGray, window, threshold: CARDINAL]
    RETURNS [value: CARDINAL] =
  BEGIN
  IF x = 0 THEN value ← 0
  ELSE value ← Inline.LongDiv[Inline.LongMult[threshold, x], maxGray + 1];
    RETURN[value];
    END;

IF (apertureSize < 2) THEN apertureSize ← 2;
  threshold ← apertureSize * apertureSize + maxDither;
  tTable ← z.NEW[IMSTypes.ThresholdTable];
  SELECT algorithm FROM
    linear = >
      BEGIN
      FOR i: CARDINAL IN [0..maxGray] DO
        tTable[i] ←
          MIN[Function[i + 1, maxGray, apertureSize, threshold], threshold] -
          Function[i, maxGray, apertureSize, threshold];
        ENDLOOP;
      tTable[0] ← tTable[0] + 1;
      IF dither THEN {
        halfDither: CARDINAL ← maxDither / 2;
        tTable[0] ← tTable[0] + halfDither;
        tTable[maxGray] ← tTable[maxGray] - halfDither;
        };
      END;
    neverMissBlack = >
      BEGIN tTable ↑ ← ALL[0]; tTable[0] ← 1; tTable[maxGray] ← threshold;
END;
    ENDCASE;
  RETURN[tTable];
  END; -- CreateThresholdTab
```

We claim:

1. A method for eliminating contours on a displayed image for an electronic reprographic system, the displayed image including an array of image signals composed of black and white binary pixels, the system having a memory for the storing the array, and a screen capable of displaying gray image signals, the gray image signals having G bits per gray level, comprising the steps of:

a) selecting a first current area of the array, the first current area including $N \times N$ binary pixels;

b) summing the black pixels in the currently selected area so that a sum of black pixels is obtained;

c) adding pseudo-random noise to the sum of black pixels to provide an adjusted sum of black pixels;

d) linearly mapping the adjusted sum of the currently selected area to provide a gray image signal;

e) selecting a subsequent current area, the subsequent current area being disposed a distance D from a previous currently selected area, wherein $N > D$;

f) repeating steps b through d until the subsequent current area is linearly mapped to the gray image signal;

g) repeating steps e and f for other $N \times N$ areas of the array until the array is converted to the gray image signals for displaying on the screen; and h) displaying the gray image signals on the screen.

2. A method for eliminating contours on a display image for an electronic reprographic system, the displayed image including an array of image signals composed of black and white binary pixels, the system having a memory for storing the array, and a screen capable of displaying gray image signals, the gray image signals having G bits per gray level, comprising the steps of:

a) selecting a first current area of the array, the first current area including a N×N binary pixels;

b) summing the black pixels in the currently selected area so that a sum of black pixels is obtained;

c) adding pseudo-random noise to the sum of black pixels to provide an adjusted sum of black pixels;

d) linearly mapping the adjusted sum of the currently selected area to provide a gray image signal;

e) selecting a subsequent current area, the subsequent current area being disposed a distance D from a previous currently selected area, wherein N<D;

f) repeating a steps b through d until the subsequent current area is linearly mapped to the gray image signal;

g) repeating steps e and f for other N×N areas of the array until the array is converted to the gray image signals for displaying on the screen; and h) displaying the gray image signals on the screen.

3. A method for eliminating contours on a display image for an electronic reprographic system, the displayed image consisting of an array of image signals composed of black and white binary pixels, the system having a memory for storing the array, and a screen capable of displaying gray image signals, the gray image signals having G bits per gray level, comprising the steps of:

a) selecting a first current area of the array consisting of N×N binary pixels;

b) summing the black pixels in the current selected area so that a sum of black pixels is obtained;

c) adding pseudo-random noise to said sum of black pixels whereby to provide an adjusted sum of black pixels wherein the pseudo-random noise is defined by a range R where $R = \pm(N \exp(2))/(2 \exp(G+1))$;

d) linearly mapping said adjusted sum to provide a gray image signal;

e) selecting a subsequent current area, the subsequent current area being disposed a distance D from a previous current area of the array;

f) repeating steps b through d until the subsequent area is linearly mapped to the gray image signal;

g) repeating steps e and f for other N×N areas of the array until the array is converted to the gray image signals for displaying on the screen; and h) displaying the gray image signals on the screen.

4. The method of claim 3, wherein N>D.

5. The method of claim 3, wherein N<D.

6. The method of claim 3, wherein N=D.

* * * * *